United States Patent

Helgesson et al.

Patent Number: 5,192,161
Date of Patent: Mar. 9, 1993

[54] FLOATING STRUCTURE FOR USE AS A BREAKWATER

[76] Inventors: Ulf Helgesson, Angsvagen 21; Bjorn Helgesson, Lycke 743, both of Brastad, Sweden, S-450 30

[21] Appl. No.: 739,903

[22] Filed: Aug. 2, 1991

Related U.S. Application Data

[62] Division of Ser. No. 530,239, May 30, 1990, abandoned.

[51] Int. Cl.⁵ ............................................. B63B 35/38
[52] U.S. Cl. ............................ 405/26; 405/195.1; 114/266; 114/267; 403/291
[58] Field of Search .................. 405/21, 26, 27, 218, 405/195.1, 203, 219; 114/263, 266, 267; 403/220, 227, 291

[56] References Cited

U.S. PATENT DOCUMENTS

| | | | |
|---|---|---|---|
| 3,091,203 | 5/1963 | Usab | 114/266 |
| 4,265,193 | 5/1981 | Sluys | 114/267 |
| 4,453,488 | 6/1984 | Watchorn | 114/266 |
| 4,487,151 | 12/1984 | Deiana | 114/266 |
| 4,543,903 | 10/1985 | Kramer | 114/263 |
| 4,852,509 | 8/1989 | Fransen et al. | 114/263 |
| 4,940,021 | 7/1990 | Rytand | 114/267 |
| 4,962,716 | 10/1990 | Fransen et al. | 114/263 |
| 5,104,271 | 4/1992 | Lechler | 403/220 X |

FOREIGN PATENT DOCUMENTS 424709 8/1982 Sweden.

Primary Examiner—Randolph A. Reese
Assistant Examiner—John A. Ricci
Attorney, Agent, or Firm—Lerner, David, Littenberg, Krumholz & Mentlik

[57] ABSTRACT

A floating structure suitable for use as a breakwater is composed of at least two displacing units have an elongated shape arranged in series. Each unit is a conventional box-like structure of reinforced concrete. The units are linked together by means of wires passing through channels provided at the top of the longitudinal sides of the units. Bodies of resilient material are fitted into recesses at the ends of the channels, and the wires also pass through these bodies. During erection of the structure the wires will be subjected to straining, and the length of the blocks and the resiliency of the material is selected so a margin will remain between meeting edges of two juxtaposed units.

6 Claims, 3 Drawing Sheets

FLOATING STRUCTURE FOR USE AS A BREAKWATER

CROSS-REFERENCES TO RELATED APPLICATIONS

The present application is a continuation-in-part of U.S. application Ser. No. 07/530,239 filed on May 30, 1990 now abandoned.

BACKGROUND OF THE INVENTION

The necessity to protect ships and boats from the influence of waves, when moored in harbors and marinas, is evident. To transform an open bay or the like into a sheltered harbor, floating breakwaters are often used.

In order for such a breakwater to operate satisfactorily, it is necessary that it has a slow roll and a low heave.

The speed of the prevailing wind at the selected location, and the free distance during which the wind may act upon the surface of the water, will determine the wave height and the wave length, i.e., the frequency of the waves acting upon the breakwater.

With a sufficiently large structure in relation to the frequency of the waves, the breakwater will be largely unaffected by the waves. Such a structure, however, is expensive to manufacture and to transport to the location of its intended use. Instead, the breakwater is composed of a number of units, which can be linked together. This is often done by means of short lengths of chain, which will provide for limited possible movement between the individual units, which means a somewhat slighter dampening action than would have been provided by a single unitary breakwater body, and which also creates a risk of collision damages.

An object of the present invention is thus to propose means for interconnecting individual units of a floating structure such as a breakwater in such a manner that it will act as a unitary structure.

SUMMARY OF THE INVENTION

In accordance with the present invention, these and other objects have now been realized by the invention of a floating structure suitable for use as a breakwater comprising a plurality of concrete displacement members having a pair of longitudinal sides, a pair of transverse sides and a top portion, each of the plurality of concrete displacement members being at least partially filled with buoyancy means comprising lightweight filler material whereby the plurality of concrete displacement members are sufficiently buoyant to be maintained above the water line when placed in a body of water, and means for maintaining the plurality of the concrete displacement members in a longitudinal series comprising corresponding longitudinally-extending channels along each of the plurality of concrete displacement members between the pairs of transverse sides and below the top portion and including end portions at the pairs of transverse sides, each of the longitudinally-extending channels including recess means at the end portions thereof whereby the recesses are juxtaposed between each of the plurality of concrete displacement members, resilient members contained within the juxtaposed recesses between each of the plurality of concrete displacement members and having a length greater than that of the juxtaposed recesses by a sufficient distance such that upon the application of a compressive force between the plurality of concrete displacement members the resilient members can bulge outwardly so as to partially fill the space between the pair of transverse sides and prevent the transverse sides from contacting each other, the resilient means including a predetermined resiliency whereby the resilient members are contained within the recesses and spaced from the pairs of transverse sides and from the top portion such that relative movement of the resilient members with respect to the plurality of concrete displacement members is substantially prevented, and tension means for rigidly attaching each of the plurality of concrete displacement members to each other with the resilient members therebetween, with sufficient tension such that the plurality of concrete displacement members are rigidly attached to each other while the corresponding transverse sides of the concrete displacement members are prevented from inadvertently contacting each other by means of the resilient member bulging outwardly so as to partially fill the space between the pair of transverse sides.

In accordance with one embodiment of the floating structure of the present invention, the longitudinally-extending channels are located adjacent to the top portions of the plurality of concrete displacement members. In a preferred embodiment the tension means comprise wire means extending through the longitudinally-extending channels of the plurality of concrete displacement members. Preferably, the floating structure includes locking means for locking the ends of the wire means at the transverse sides of the outermost ones of the plurality of concrete displacement members whereby the wire means may be tensioned and locked by the locking means under such tension.

A floating structure hereof is composed of at least two displacing units having an elongated shape arranged in series and defined by longitudinal and transverse sides, and having a top face. The units are manufactured as boxes of concrete, or pontoons, and are at least partially filled with lightweight material so as to hold the top face with a margin above the surface of the surrounding water. The units are further provided with channels extending from one transverse side to the opposite transverse side, along the tops of their longitudinal sides, and area-enlarging recesses are formed at both ends of these channels. Means for rigidly interconnecting the units includes blocks of resilient material fitted in the recesses, at least one strand of wire extending through each channel and associated blocks. Means for straining each of these wires, and for locking the ends thereof, are provided at the outermost transverse sides of this series of units, the unstrained length and the resiliency of the blocks being sufficient to prevent adjacent transverse sides of the units to meet after the straining.

In this manner, the units are held together and will roll and heave in unison, which increases the dampening action. Usually, there are a number of wires, suitably three, in each channel.

DESCRIPTION OF A PREFERRED EMBODIMENT

Figure 1:
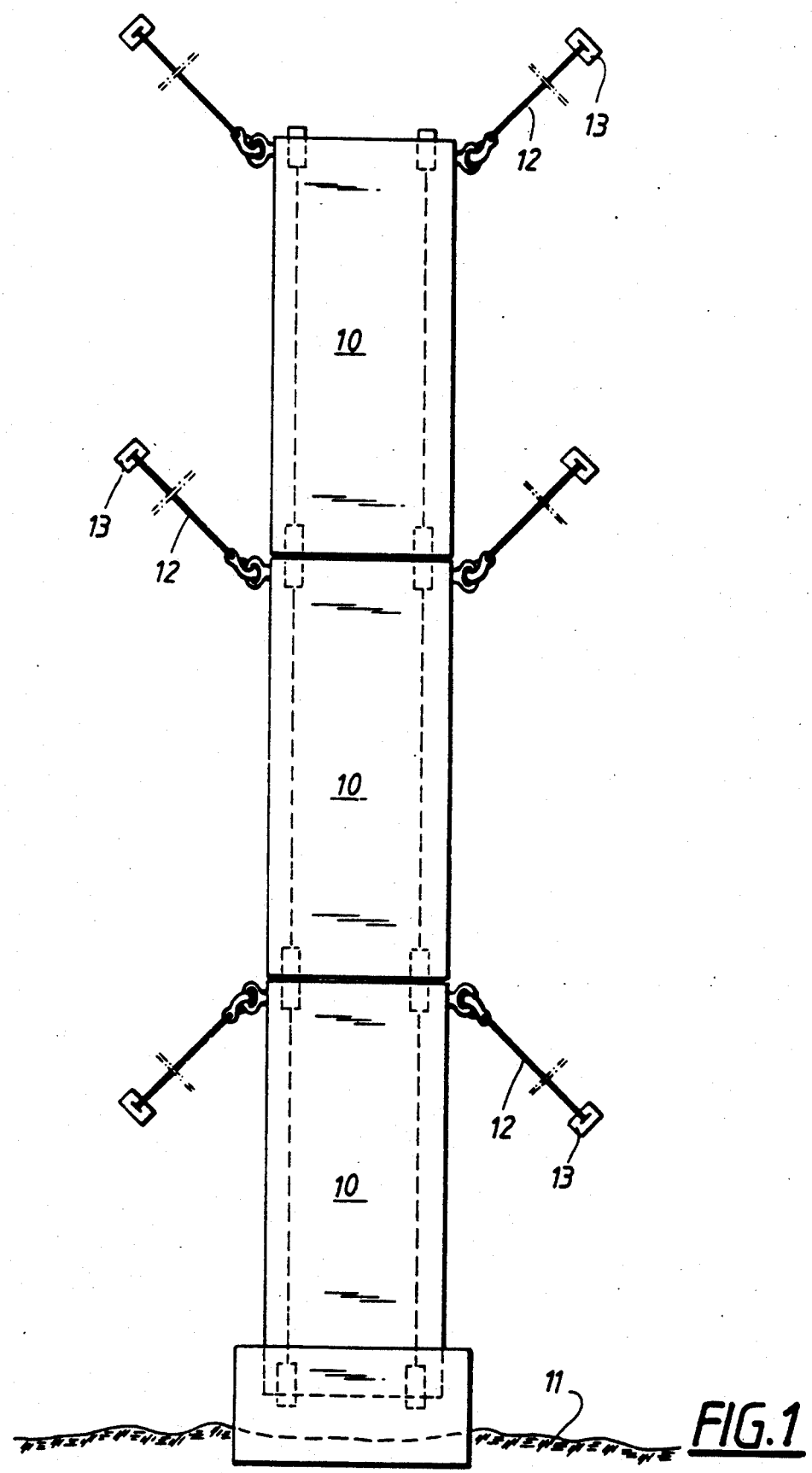
FIG. 1 shows a top, perspective view of a floating structure according to the present invention, composed of three units.

The floating structure schematically shown in FIG. 1 is composed of three similar units 10, linked together according to the invention. They may be adjacent an estuary 11, or may be offshore, and are moored by means of chains or cables 12 connected to suitable anchors on the bottom of the sea.

Each unit 10 has two longitudinal sides 14 and two transverse sides 15, as well as a top face 16. They are manufactured as boxes of reinforced concrete, or pontoons, the top face 16 being the bottom of the box during casting.

Figure 2:
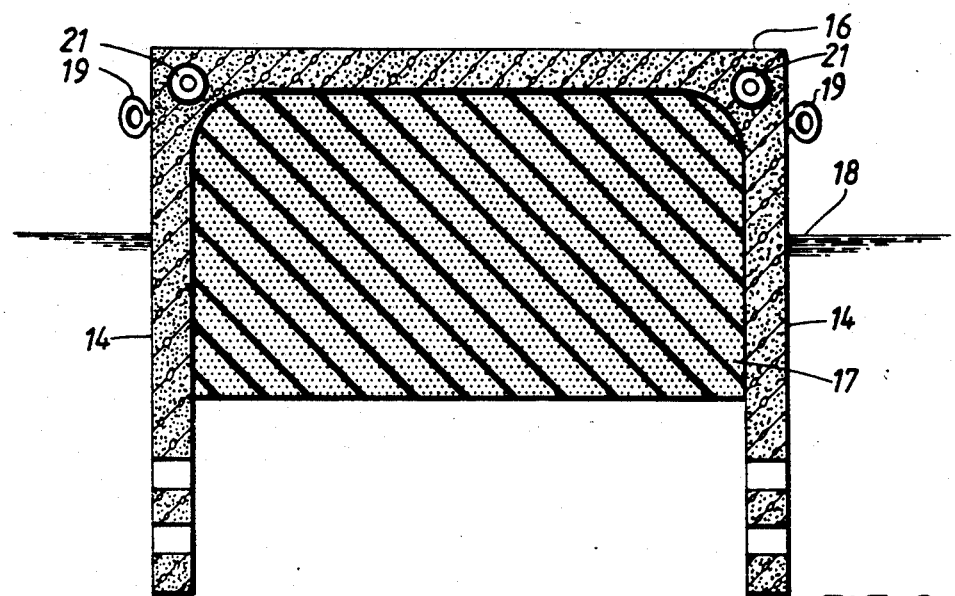
FIG. 2 shows a side, cross-sectional view through one of the units shown in FIG. 1.

As shown in FIG. 2, the structure is partly filled with some lightweight material 17, for instance foamed plastics, which may be cast therein, or fitted thereinto as blocks. The resulting buoyancy will, in use, hold the top face 16 with a satisfactory margin above the surface 18 of the surrounding water.

The boxes or pontoons are provided with cast-in staples 19 for the anchor wires 12. The longitudinal sides 14 project downwards, past the transverse side 15 and will, in use, between themselves entrap a volume of water, which aids in resisting any rolling action. To increase this dampening action the downwardly projecting portions of the longitudinal sides 14 are provided with rows of holes 20, which cause turbulence in the water.

The interconnection of the units comprises channels 21 along the tops of the longitudinal sides 12. Each channel is at both ends enlarged to a recess 22. Channels and recesses are suitably formed by fitting appropriate tubes, for instance of plastics, into the mold when casting the box unit. The recesses 22 preferably extend a significant distance into the box unit, such as between about 2 and 4 inches (or between about 50 and 100 mm), for the purposes discussed below.

A block 23 of some resilient material, preferably a material such as polyurethane rubber, having a Shore hardness of between about 70 and 98, is fitted into the recesses 22 of two juxtaposed units 10. At least one wire 24 extends right through each channel, from the outermost transverse sides, and is locked thereto after having been subjected to hard straining.

Figure 4:
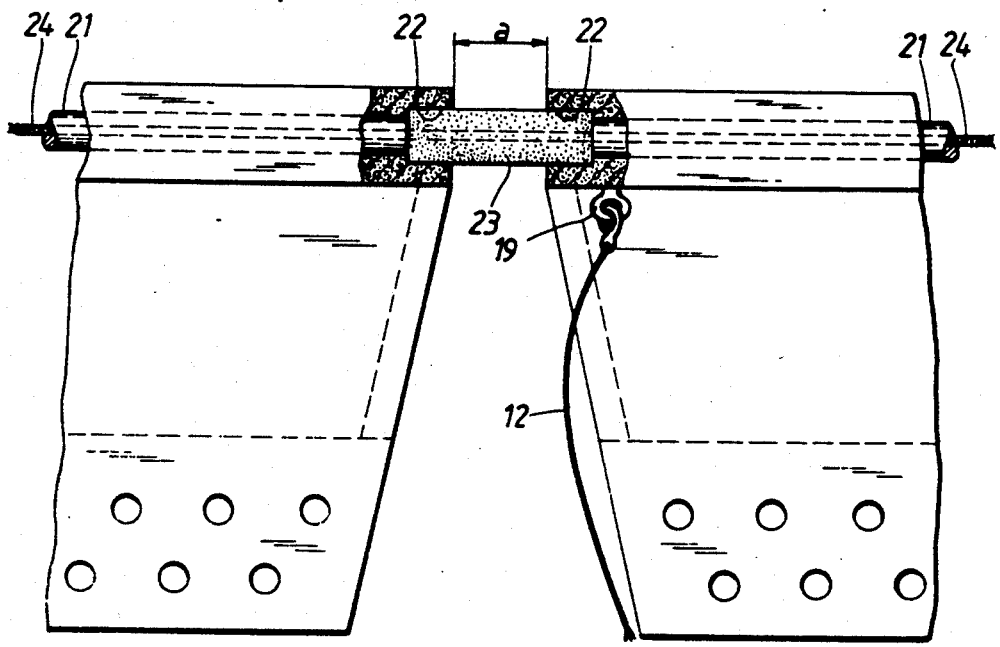
FIG. 4 shows a side, partially cross-sectional view of the ends of two of the units shown in FIG. 1 with the wire in its unstrained condition.
Figure 5:
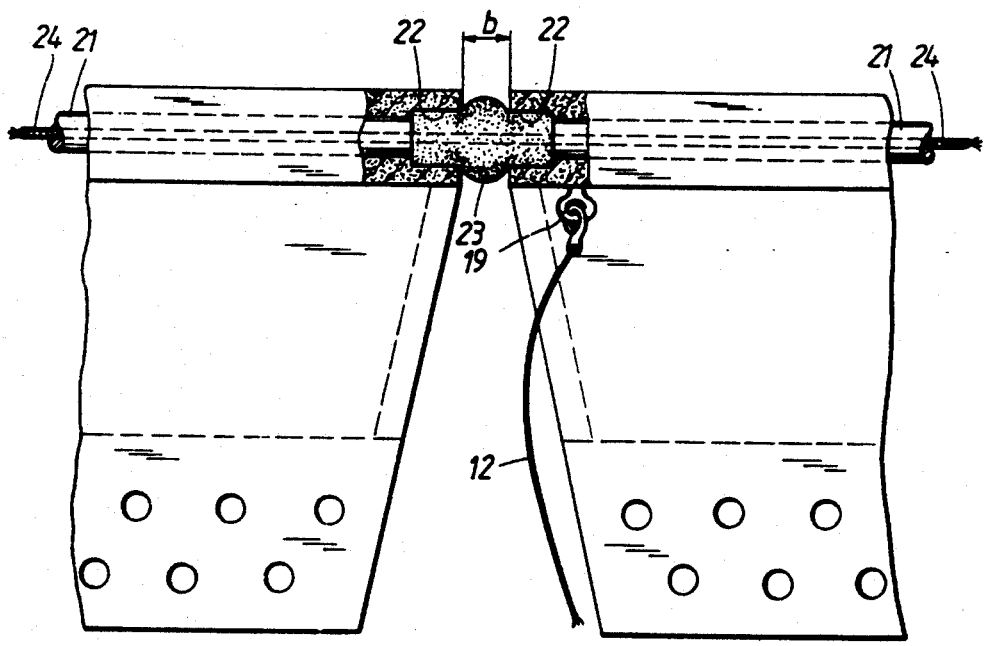
FIG. 5 shows a partial, side, partially cross-sectional view of the two units shown in FIG. 4.

The length of a block 23 and the resiliency of the material thereof is so selected, that in unstrained condition a distance a remains between juxtaposed transverse edges of the units (FIG. 4). After the straining operation, the blocks have been compressed, so only a short margin b remains between the edges (FIG. 5). The middle portion of the blocks will bulge outwards, and will maintain this margin, thus preventing the edges of the units from grinding against each other. This, in turn, requires that the block 23 not only have the resiliency and Shore hardness discussed above, but also that the recess 22 be deep enough to stabilize the block 23. It is also preferred that the block 23 be long enough such that the distance a is at least about 0.4 inches (about 10 mm), and preferably about 1.6 inches (about 40 mm), such that the distance b, even under maximum stress, will be at least about 0.25 inches (about 6.4 mm).

Figure 3:
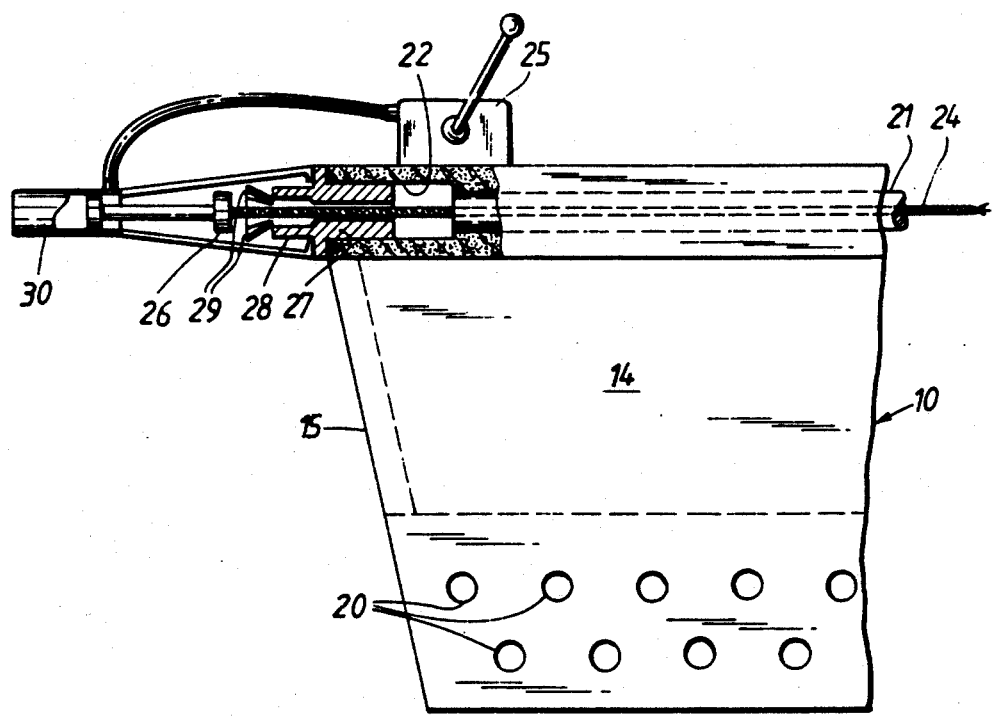
FIG. 3 shows a partial, side, partially cross-sectional view of an end portion of one of the units shown in FIG. 1, including means for straining a wire.

The straining of the wires may be brought about by any suitable mechanism of known type. FIG. 3 shows one way of straining, and includes a hydraulic ram 30 removably fitted to the outward end of a unit 10, and connected to a hydraulic hand pump 25. The piston rod of the ram is suitably connected to the end of the wire 24 by some clutch 26. A plug 27 is fitted into the recess 22 and is provided with an annular collar 28. A number of wedges 29 are loosely fitted in the collar 28, and are driven home, when the straining has been completed.

A number of wires 24, for instance three, are advantageously fitted in each channel, even if only one is shown for the sake of simplicity. The straining can be made from one end of the series of units, but it is also possible to fit hydraulic rams to both ends of a wire.

The number of units will depend upon the total length to be protected. After the straining the individual units will act as an integral structure having very fine dampening properties. The degree of strain which can thus be applied to wires 24 in the case of this invention is quite high, primarily because of the nature of the recesses 22 and of the block 23 as discussed above. It is thus possible to place considerable tension upon the wires 24 so as to reduce relative motion between adjacent boxes or pontoons, preferably a tension of between about 5 and 30 metric tons. These linked units in accordance with this invention thus cooperate to reduce wave-induced motion, particularly as compared to prior art individual floating units which are linked together, as in U.S. Pat. No. 3,091,203, for example. The rigid attachment which is thus attainable in accordance with the present invention also reduces the risk of inadvertent contact between adjacent such units.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. For example, although the structure has been described in the above disclosure as being particularly suitable as a breakwater, it may also advantageously be used in applications where wave-damping is not a prerequisite.

We claim:

1. A floating structure suitable for use as a breakwater comprising a plurality of concrete displacement members having a pair of longitudinal sides, a pair of transverse sides and a top portion, each of said plurality of concrete displacement members being at least partially filled with buoyancy means comprising lightweight filler material whereby said plurality of concrete displacement members are sufficiently buoyant to be maintained above the water line when placed in a body of water, and means for maintaining said plurality of said concrete displacement members in a longitudinal series comprising corresponding longitudinally-extending channels along each of said plurality of concrete displacement members between said pairs of transverse sides and below said top portion and including end portions at said pairs of transverse sides, each of said longitudinally-extending channels including recess means at said end portions thereof whereby said recesses are juxtaposed between each of said plurality of concrete displacement members, said recesses having a length of between about 2 and 4 inches, resilient members contained within said juxtaposed recesses between each of said plurality of concrete displacement members and having a length greater than that of said juxtaposed recesses by a distance of at least about 0.4 inches such that upon the application of a compressive force between said plurality of concrete displacement members said resilient members will bulge outwardly so as to partially fill the space between said pair of transverse sides and prevent said transverse sides from contacting each other, said resilient means including a predetermined resiliency and having a Shore hardness of between about 70 and 98 whereby said resilient members are contained within said recesses and spaced from said pairs of transverse sides and from said top portion such that relative movement of said resilient members with respect to said plurality of concrete displacement members is substantially prevented, and tension means for rigidly attaching each of said plurality of concrete displacement members to each other with said resilient members therebetween, with sufficient tension such that said plurality of concrete displacement members are rigidly attached to each other while said corresponding transverse sides of said concrete displacement members are prevented from inadvertently contacting each other by means of said resilient member bulging outwardly so as to partially fill said space between said pair of transverse sides.

2. The floating structure of claim 1 wherein said longitudinally-extending channels are located adjacent to said top portions of said plurality of concrete displacement members.

3. The floating structure of claim 1 wherein said tension means comprises wire means extending through said longitudinally-extending channels of said plurality of concrete displacement members.

4. The floating structure of claim 3 including locking means for locking the ends of said wire means at the transverse sides of the outermost ones of said plurality of concrete displacement members whereby said wire means may be tensioned and locked by said locking means under said tension.

5. The floating concrete structure of claim 1 wherein said resilient members have a length greater than that of said juxtaposed recesses by a distance of at least about 1.6 inches.

6. The floating structure of claim 1 wherein said tension means rigidly attaches each of said plurality of concrete displacement members to each other with said resilient members therebetween such that under maximum tension the distance between said plurality of concrete displacement members will be at least about 0.25 inches.

* * * * *